July 20, 1965

R. A. WOLFE, SR 3,195,671

AUTOMATIC RADIO REMOTE CONTROL VEHICULAR
SPEED GOVERNING MECHANISM

Filed Nov. 16, 1962

INVENTOR.
RICHARD A. WOLFE, SR.

BY
McMorrow, Berman & Davidson
ATTORNEYS.

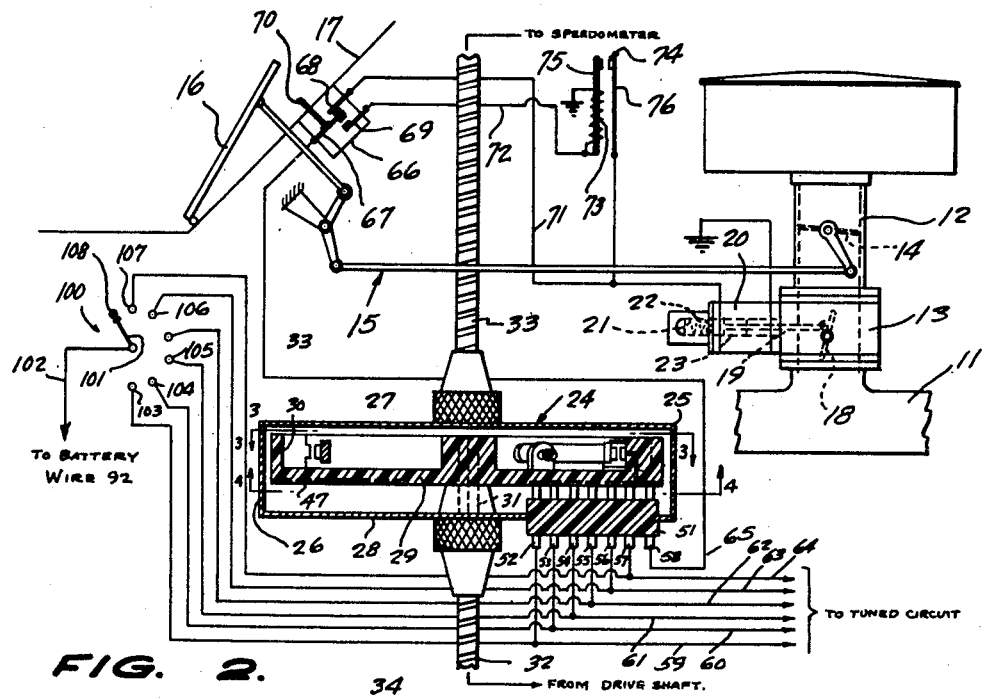

United States Patent Office 3,195,671
Patented July 20, 1965

3,195,671
AUTOMATIC RADIO REMOTE CONTROL VEHICULAR SPEED GOVERNING MECHANISM
Richard A. Wolfe, Sr., Abita Springs, La.
(Box 50, Natchitoches, La.)
Filed Nov. 16, 1962, Ser. No. 238,113
10 Claims. (Cl. 180—82.1)

This invention relates to motor vehicle safety equipment and more particularly to an improved motor vehicle speed control device.

A main object of the invention is to provide a novel and improved speed control device for a motor vehicle, said device involving relatively simple components, being automatic in operation, and serving to automatically diminish the supply of fuel to the engine of a motor vehicle provided with the device so as to reduce the speed of the engine to idling speed when the vehicle exceeds a predetermined speed.

A further object of the invention is to provide an improved motor vehicle speed control device which involves relatively inexpensive components, which is easy to install, which is reliable in operation, and which is arranged so that it automatically limits the speed of the motor vehicle equipped with the device to a predetermined maximum speed, established by the presence of a corresponding radio signal in the area through which the vehicle is traveling.

A still further object of the invention is to provide an improved automatic speed control device for a motor vehicle, said device being relatively compact in size, being arranged so that it may be connected to a conventional speedometer, being arranged so that it may be controlled either manually or by an external radio transmitter operated by traffic authorities or other authorized persons, so as to impose a reduced maximum speed on the motor vehicle when it is traveling through a particular area, and being further provided with means to temporarily override the action of the device to enable the operator of the vehicle to increase the speed thereof if necessary for passing another vehicle, or for other emergency reasons.

Further objects and advantages of the invention will become apparent from the following description and claims, and from the accompanying drawings, wherein:

FIGURE 2 is a vertical cross sectional view taken through portions of a motor vehicle equipped with elements of the speed control device of FIGURE 1 and showing the electrical connections of said portions to associated parts of the vehicle.

FIGURE 3 is a horizontal cross sectional view taken substantially on the line 3—3 of FIGURE 2.

FIGURE 4 is a horizontal cross sectional view taken substantially on the line 4—4 of FIG. 2.

FIGURE 5 is an enlarged cross sectional detail view taken substantially on the line 5—5 of FIGURE 3.

Figure 1:
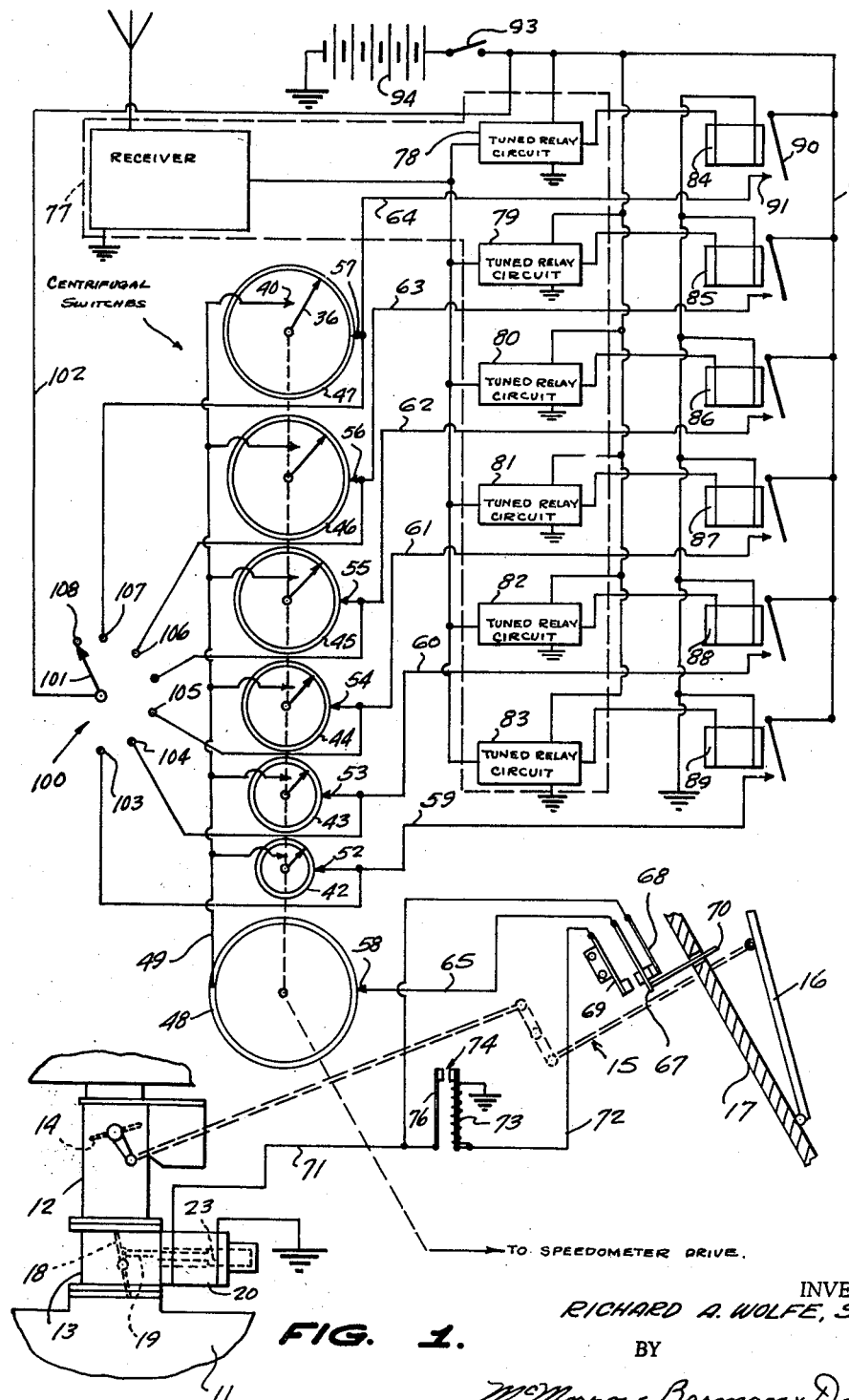
FIGURE 1 is a schematic diagram showing the electrical connections of an improved motor vehicle speed control device constructed in accordance with the present invention.

Referring to the drawings, 11 designates the intake manifold of the internal combustion engine of a motor vehicle, and 12 designates a conventional carburetor which is connected to said intake manifold through the tubular body 13 of a control valve assembly which is interposed between the carburetor 12 and the intake manifold 11, as is clearly sown in FIGURE 2. The carburetor is provided with the usual throttle butterfly valve 14 which is connected by a conventional operating linkage, designated generally at 15 to the accelerator pedal 16 pivoted to the floor board 17 of the motor vehicle.

Pivotally mounted inside the valve body 13 is a butterfly valve 18 to which is connected a control rod 19 which extends axially through the bore of a solenoid winding 20 mounted on the casing 13 and which terminates in a headed portion 21. A coiled spring 22 surrounds the external portion of the rod 19, bearing between the headed portion 21 and the outer end of the solenoid 20, biasing the butterfly valve 18 to the open position thereof shown in dotted view in FIGURE 2. A magnetic plunger 23 is secured on the rod 19 and is slidable in the bore of the solenoid 20, being urged to the right, as viewed in FIGURE 2, responsive to the energization of the solenoid, thereby rotating the butterfly valve 18 to a substantially closed position.

Under normal conditions, namely, when the solenoid 20 is deenergized, the spring 22 acts on the rod 19 through the head 21 to bias the butterfly valve 18 towards a wide-open position. When the solenoid 20 is energized, the valve 18 is rotated, as above described, causing it to substantially close off the communicating passage between the manifold 11 and the carburetor 12, allowing only a limited amount of fuel to pass from the carburetor to the manifold, whereby the engine is held to an idling speed, namely, producing substantially the same condition which would prevail if the accelertor pedal 16 were completely released.

Designated generally at 24 is a multiple speed-responsive switch device which comprises a generally circular casing 25 having a cylindrical wall 26 and top and bottom circular walls 27 and 28. Rotatably mounted in the casing 25 is a generally circular disc member 29 of insulating material, said disc member having the upstanding peripheral wall 30 and being provided with the squared central shaft 31. The shaft 31 is coupled into the driving connection between the motor vehicle drive shaft and the speedometer of the vehicle, the squared shaft 31 being thus drivingly coupled between the flexible shaft assembly 32 leading to the vehicle drive shaft and the flexible shaft assembly 33 leading to the speedometer. The disc member 29 is thus driven simultaneously with the speedometer cable and thus rotates at a speed corresponding to the speed of the vehicle.

Rigidly secured to the inside of the upstanding peripheral wall 30 of disc member 29 is a conductive metal ring 34 formed with the uniformly spaced inwardly projecting triangular lugs 35, for example, being formed with six uniformly spaced inwardly projecting triangular lugs. Pivoted to the disc member 29 adjacent each of the lugs 35 is a switch arm 36 having secured to its pivoted portion an inwardly projecting leaf spring 37 which is engageable with the end of an adjustable stop screw 38 threadedly engaged through an upstanding lug 39 provided therefor on the disc member 29. Each lug 35 is provided with a contact point 40 and each arm 36 is provided with a mating contact point 41 adapted to engage with the contact 40 responsive to counterclockwise rotation of the arm 36, as viewed in FIGURE 3. The arms 36 are urged outwardly by centrifugal force when the disc member 29 is rotated by the speedometer cable, and the contacts 40 and 41 will engage at a predetermined speed, determined by the setting of the associated stop screw 38. Thus, the respective screws 38 are set so that their associated contacts 41 and 40 will close at predetermined speed values, for example, 15 miles per hour, 25 miles per hour, 35 miles per hour, 45 miles per hour, 55 miles per hour and 65 miles per hour respectively.

Concentrically mounted in the bottom of the disc member 29 and being exposed beneath the disc member are the respective conductive rings 42, 43, 44, 45, 46, 47 and 48. The outermost ring 48 is conductively connected to the conductive ring member 34, as by a wire 49, shown in FIGURE 5. The respective contact arms 36 are connected to the respective rings 42 and 47 by suitable conductors, such as the wire 50 illustrated in FIGURE 5.

Thus, each arm 36 is electrically connected to one of the conductor rings 42 to 47, and all of the contact elements 40 are electrically connected to the outer contact ring 48, as diagrammatically illustrated in FIGURE 1.

Mounted in the bottom wall 28 of the switch housing 25 is an insulating block 51 in which are mounted the radially arranged row of contact brush assemblies 52 to 58 which are vertically disposed, as illustrated in FIGURE 2, and which have spring biased top end portions which respectively engage the contact rings 42 to 48 with wiping contact. The contact brushes 52 to 58 are connected to the respective connection wires 59 to 65.

Mounted in the floorboard 17 immediately below the free outer end portion of the accelerator pedal 16 is a single pole double throw switch assembly 66 having the movable pole 67 which normally engages the stationary upper contact 68 and which is movable downwardly to engage an opposing stationary contact 69. Mounted on the pole 67 is an upwardly projecting operating pin 70 which is engageable by the accelerator pedal 16 when the pedal is fully depressed, whereby to move the pole 67 away from the upper contact 68 and into engagement with the lower contact 69. As previously mentioned, the pole 67 normally engages the upper contact 68.

The upper contact 68 of the switch 66 is connected by a wire 71 to one terminal of the solenoid 20. The remaining terminal of the solenoid is grounded. The pole 67 is connected to the wire 65. The lower contact 69 is connected by a wire 72 to one terminal of a heater winding 73 of a normally open thermal delay switch, designated generally at 74, the remaining terminal of the heater winding 73 being grounded. The bimetal arm 75 of switch 74 which is enclosed within the winding 73, is connected to the wire 72. The switch 74 is provided with a stationary contact arm 76 which is connected to the wire 71. Thus, when the accelerator pedal 16 is fully depressed, the heater winding 73 is connected between wire 65 and ground by the engagement of pole 67 with stationary contact 69.

Mounted on the motor vehicle is a radio receiver, designated generally at 77 provided with respective output circuits 78 to 83, responsive to six different respective signal frequencies and each having a relay connected in its output circuit, for example, the relays 84 to 89 each of which becomes energized responsive to the reception by its associated tuned receiver circuit of a radio signal to which said circuit is resonant. Each of the relays 84 to 89 is provided with the normally opened switch contacts 90 and 91 which close responsive to the energization of the relay. The respective contact brush assemblies 52 to 57 are connected through the wires 59 to 64 and the contacts 90, 91 of the respective relays 84 to 89 to a wire 92. The wire 92 is connected through a master manually operated control switch 93 to the ungrounded terminal of the vehicle storage battery 94.

The respective signal frequencies for resonating the tuned circuits 78 to 83 correspond to respective different speed limit values which it may be desired to enforce in a particular area containing a control radio transmitter. The different radio frequencies therefore may correspond to the respective different speed limit values previously given, for example, 15 miles per hour, 25 miles per hour, 35 miles per hour, 45 miles per hour, 55 miles per hour and 65 miles per hour. Thus, assuming that the desired speed limit in the area is to be 15 miles per hour, a signal is transmitted of a frequency which will energize the tuned circuit 78 of the vehicle receiver 77, causing the associated contacts 90, 91 of the relay 84 to close. When the vehicle speed reaches the limiting value, namely, 15 miles per hour, the centrifugally operated switch arm 36 of the multiple centrifugal switch assembly 24 is moved outwardly by centrifugal force sufficiently to cause its contact 41 to engage the associated contact 40. This connects the wire 64 through the brush assembly 57, the ring 47, the arm 36, the contact 40, and the wire 49 to the outer ring 48, which is in turn connected by its contact brush 58 and wire 65 through switch pole 67, upper contact 68 and wire 71 to the ungrounded terminal of the solenoid 20. With the master switch 93 closed, this connects the ungrounded terminal of battery 94 to the ungrounded terminal of solenoid 20 through a circuit comprising switch 93, wire 92, the contacts 90, 91, the wire 64, the brush 67, the ring 47, the switch arm 36, the contact 40, the wire 49, the ring 48, the brush 58, the wire 65, the switch contacts 67 and 68 and the wire 71. The solenoid 20 becomes energized and rotates the butterfly valve 18 to a substantially closed position, causing the vehicle to reduce its speed to idling speed.

A similar action will be provided when a different speed limit value is imposed, namely, a speed limit value corresponding to the various other speed limit values required to close the remaining centrifugally operated switch pairs of the multiple centrifugal switch assembly 24. In each case, the solenoid 20 will become energized when a control radio signal is present in the area containing the vehicle and when the vehicle speed rises to a sufficient value to close the corresponding centrifugally operated switch pair of the multiple centrifugal switch assembly 24.

It will be noted that the apparatus is arranged so that more than one of the predetermined speed-controlling signal frequencies can be received at one time; under these conditions, namely, where a plurality of the signal frequencies are simultaneously received, the apparatus will effectively respond to the signal frequency corresponding to the lowest speed value and will not allow the solenoid 20 to stay deenergized if the vehicle travels at a speed equal to or higher than said lowest speed value.

The operator of the vehicle may be allowed to regain temporary control of the vehicle speed by depressing the accelerator pedal 16 sufficiently to cause pole 67 to disengage from contact 68 and to engage the bottom contact 69. This may be required for emergency reasons, for example, for enabling the vehicle to pass another vehicle or to perform any other required emergency maneuver. With pole 67 depressed into engagement with bottom contact 69 the bimetal arm heater winding 73 is substituted for the solenoid 20 and the solenoid becomes deenergized by the disengagement of pole 67 from upper contact 68. This allows the spring 22 to rotate butterfly valve 18 to its open position, restoring direct control of the vehicle to the operator until the bimetal arm 75 has heated sufficiently to engage the stationary contact arm 76. When arm 75 engages contact arm 76, the ungrounded terminal of solenoid 20 is connected through arms 75 and 76, wire 72, contact 69 and pole 67 to the wire 65, whereby the solenoid 20 is again energized and moves the butterfly valve 18 to its substantially closed position. Thus, the vehicle is again forced to reduce its speed.

The system above described may be employed in conjunction with a manually controlled switch which is operable by the vehicle driver instead of relying upon an external control radio signal. Thus, a multiple position rotary switch 100 may be provided on the vehicle, the switch having a pole 101 which is connected by a wire 102 to the battery wire 92. The switch 100 is provided with the respective stationary contacts 103 to 107 connected to the respective wires 59 to 64 so that the switch 100 may be operated manually to provide the same result as is provided by the radio signal-controlled relays 84 to 89. The switch 100 is provided with a blank contact 108 which the pole 101 may engage when radio control is relied on.

Suitable key-controlled locking means may be provided to enable the owner or authorized operator of the vehicle to lock the switch 100 with the pole 101 thereof in any desired position, so that it is necessary to unlock the switch by means of its key in order to change its position of adjustment.

It will be readily apparent from the above description that the apparatus as above described speed limiting will be obtained either when a radio signal corresponding to a desired limited speed is transmitted in the area through which the vehicle is passing (with the main control switch 93 closed), or if the manually operated switch 100 is set by the vehicle driver to cause the pole 101 to engage one of the contacts 103 to 107, corresponding to the desired limiting speed.

While a specific embodiment of an improved automatic speed controlling apparatus for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a fuel supply conduit, normally open valve means in said supply conduit, electromagnetic closing means operatively connected to said valve means, a source of current, a speed-responsive switch, means to close said switch at a predetermined speed of the vehicle, a receiver provided with a plurality of tuned output circuits responsive to different signal frequencies and each having a switch means closing responsive to the reception of a predetermined signal frequency by the radio receiver, and means connecting said electromagnetic closing means to said source through said speed-responsive switch and one of said switch means, whereby said electromagnetic closing means will be energized responsive to reception of a radio signal of proper frequency to close said one of the switch means if the vehicle exceeds said predetermined speed.

2. In a motor vehicle, a fuel supply conduit, normally open valve means in said supply conduit, electromagnetic closing means operatively connected to said valve means, a source of current, an accelerator pedal, a speed-responsive switch, means to close said switch at a predetermined speed of the vehicle, a radio receiver provided with a plurality of tuned output circuits responsive to different signal frequencies and each having a switch means closing responsive to the reception of a predetermined signal frequency by the radio receiver, means connecting said electromagnetic closing means to said source through said speed-responsive switch and one of said switch means, whereby said electromagnetic closing means will be energized responsive to reception of a radio signal of proper frequency to close said one of the switch means if the vehicle exceeds said predetermined speed, a normally open slow-closing switch, and means operated by said accelerator pedal to at times connect said slow-closing switch in circuit with said electromagnetic closing means and speed-responsive switch.

3. In a motor vehicle, a fuel supply conduit, normally open valve means in said supply conduit, electromagnetic closing means operatively connected to said valve means, a source of current, an accelerator pedal, a speed-responsive switch, means to close said switch at a predetermined speed of the vehicle, a radio receiver provided with a plurality of tuned output circuits responsive to different signal frequencies and each having a switch means closing responsive to the reception of a predetermined signal frequency by the radio receiver, means connecting said electromagnetic closing means to said source through said speed-responsive switch, and one of said switch means, whereby said electromagnetic closing means will be energized responsive to reception of a radio signal of proper frequency to close said one of the switch means if the vehicle exceeds said predetermined speed, a normally open slow-closing switch, means including a heater winding to slowly close said last-named switch responsive to energization of said heater winding, and means operated by said accelerator pedal to simultaneously connect said last-named switch in circuit with said electromagnetic closing means and to energize said heater winding.

4. In a motor vehicle, a fuel supply conduit, normally open valve means in said supply conduit, electromagnetic closing means operatively connected to said means, a source of current, an accelerator pedal, a speed-responsive switch, means to close said switch at a predetermined speed of the vehicle, a radio receiver provided with a plurality of tuned output circuits responsive to different signal frequencies and each having a switch means closing responsive to the reception of a predetermined signal frequency by the radio receiver, means connecting said electromagnetic closing means to said source through said speed-responsive switch and one of said switch means, wherey said electromagntic closing means will be energized responsive to reception of a radio signal of proper frequency to close said one of the switch means if the vehicle exceeds said predetermined speed, a normally open slow-closing switch, means including a heater winding to slowly close said last-named switch responsive to energization of said heater winding, and means operated by said accelerator pedal to simultaneously connect said last-named switch in circuit with said electromagnetic closing means and to energize said heater winding.

5. In a motor vehicle, a fuel supply conduit, normally open valve means in said supply conduit, electromagnetic closing means operatively connected to said valve means, a source of current, a centrifugal switch, means to close said switch at a predetermined speed of the vehicle, a radio receiver provided with a plurality of tuned output circuits responsive to different signal frequencies and each having a switch means closing responsive to the reception of a predetermined signal frequency by the radio receiver, and means connecting said electromagnetic closing means to said source through said centrifugal switch and one of said switch means, whereby said electromagnetic closing mean will be energized responsive to reception of a radio signal of proper frequency to close said one of the switch means if the vehicle exceeds said predetermined speed.

6. In a motor vehicle, a fuel supply conduit, normally open valve means in said supply conduit, electromagnetic closing means operatively connected to said valve means, a source of current, a centrifugal switch, means to close said switch at a predetermined speed of the vehicle, a radio receiver provided with a plurality of tuned output circuits responsive to different signal frequencies and each having a switch means closing responsive to the reception of a predetermined signal frequency by the radio receiver, means connecting said electromagnetic closing means to said source through said centrifugal switch and one of said switch means, whereby said electromagnetic closing means will be energized responsive to reception of a radio signal of proper frequency to close said one of the switch means if the vehicle exceeds said predetermined speed, a normally open thermal switch, a heater winding in heat-transmitting relation to said thermal switch to close same after a predetermined period of energization of said heater winding, and means to at times simultaneously connect said thermal switch in circuit with said electromagnetic closing means, centrifugal switch and said one of the switch means and to energize the heater winding, whereby to prevent energization of said electromagnetic closing means for said predetermined period.

7. In a motor vehicle, a fuel supply conduit, normally open valve means in said supply conduit, electromagnetic closing means operatively connected to said valve means, a source of current, a plurality of centrifugal switches, means to close each centrifugal switch responsive to a respective predetermined speed of the vehicle, a radio receiver provided with a plurality of tuned output circuits responsive to different signal frequencies and each having a switch means closing responsive to the reception of a predetermined signal frequency, means connecting the respective switch means in series with the centrifugal switches, whereby to define respective circuit branches closing responsive to the coincident reception of a predetermined signal frequency and closure of the associated centrifugal switch, and means to selectively connect said circuit branches in series with said source and said electromagnetic closing means.

8. In a motor vehicle, a fuel supply conduit, normally open valve means in said supply conduit, electromagnetic closing means operatively connected to said valve means, a source of current, a plurality of speed-responsive switches, means to close the switches responsive to respective predetermined speeds of the vehicle, a radio receiver provided with a plurality of tuned output circuits responsive to different signal frequencies and each having a switch means closing responsive to the reception of one of said signal frequencies, means connecting the respective speed-responsive switches in series with the last-named switch means, whereby to define respective branch circuits closing responsive to coincident reception of a predetermined signal frequency and closure of the associated speed-responsive switch, and means to selectively connect said circuit branches in series with said source and said electromagnetic closing means.

9. In a motor vehicle, a fuel supply conduit, normally open valve means in said supply conduit, electromagnetic closing means operatively connected to said valve means, a source of current, a plurality of speed-responsive switches, means to close the switches responsive to respective predetermined speeds of the vehicle, a radio receiver provided with a plurality of tuned output circuits responsive to different signal frequencies and each having a switch means closing responsive to the reception of one of said signal frequencies, means connecting the respective speed-responsive switches in series with the last-named switch means, whereby to define respective branch circuits closing responsive to coincident reception of a predetermined signal frequency and closure of the associated speed-responsive switch, means to selectively connect said circuit branches in series with said source and said electromagnetic closing means, an accelerator pedal, a normally open slow-closing switch, and means operated by said accelerator pedal to at times connect said slow-closing switch in circuit with the source, the electromagnetic closing means and the selected circuit branch.

10. In a motor vehicle, a fuel supply conduit, normally open valve means in said supply conduit, electromagnetic closing means operatively connected to said valve means, a source of current, a speed-responsive switch, means to close said switch at a predetermined speed of the vehicle, a further switch, a radio receiver having a tuned circuit, means to close said further switch responsive to the reception of a radio signal by said receiver resonant with said tuned circuit, and means connecting said electromagnetic closing means to said circuit through said speed-responsive switch and said further switch.

References Cited by the Examiner
UNITED STATES PATENTS

| | | | |
|---|---|---|---|
| 1,248,130 | 11/17 | Kammerhoff | 180—82.1 |
| 2,273,365 | 2/42 | McCullough | 340—53 |
| 2,454,659 | 11/48 | Leonard | 180—82.1 |
| 3,017,946 | 1/62 | Davis et al. | 340—53 |

NEIL C. READ, *Primary Examiner.*